Patented Apr. 11, 1950

2,503,797

UNITED STATES PATENT OFFICE 2,503,797

PROCESS FOR THE MANUFACTURE OF DIAMINO-DIPHENYL-UREAS

Albert Brunner, Riehen, Switzerland, assignor to Ciba Limited, a Swiss firm

No Drawing. Application November 7, 1947, Serial No. 784,767. In Switzerland November 18, 1946

4 Claims. (Cl. 260—553)

Diphenyl-ureas in which each phenyl residue contains an amino group are valuable intermediate products for the manufacture of various azo-dyestuffs. Such products have been made hitherto chiefly by the reduction of the corresponding dinitro-diphenyl-ureas.

It is an object of the present invention to provide a simple and economical process for the manufacture of diamino-diphenyl-ureas. A further object is to provide a novel process of the kind referred to which hitherto has not been, and reasonably could not be, expected to work. Further objects will in part be obvious and in part appear as the specification proceeds.

It is known that diphenyl-ureas can be made by the condensation of urea with various aminobenzenes (compare, inter alia, S. M. Mistry and P. C. Cuha, Journal of the Indian Chemical Society, vol. 7, page 793). If, however, the reaction is carried out with diaminobenzenes in the presence of amyl alcohol in accordance with the authors' direction, there is obtained with the use of ortho-phenylene diamine the cyclic ortho-phenylene urea and with the use of meta-phenylene diamine a polymeric product which cannot be tetrazotized and is therefore useless as an intermediate product for the manufacture of azo-dyestuffs.

The present invention is based on the observation that diamino-diphenyl-ureas can be obtained by the condensation of diaminobenzenes, of which the amino groups are not in ortho-position relatively to one another, with urea by working in an aqueous medium at a raised temperature.

As examples of diaminobenzenes suitable for use in the present invention there may be mentioned: 1-methyl-2:4-diaminobenzene, 1-methoxy-2:4-diaminobenzene, 1:4-diamino-2-chlorobenzene, 1:4-diaminobenzene-2-carboxylic acid, 1:4-diaminobenzene-2-sulfonic acid, and especially 1:4- and 1:3-diaminobenzene.

The condensation of the reacting components is advantageously conducted in a relatively concentrated aqueous solution and at temperatures of the order of about 100° C. In most cases it suffices to boil the mixture in a reflux apparatus. Working under pressure is of course possible, but more troublesome and does not usually lead to substantially improved yields and is therefore not generally indicated.

As considerable quantities of ammonia are split off during the reaction, the reaction mixture becomes alkaline very rapidly unless a sufficient quantity of an agent capable of binding alkali, for example, a mineral acid, is previously added.

While the course of the reaction of para-phenylene diamine with urea is not adversely affected, it has been found that good results in the corresponding reaction of meta-phenylene diamine with urea are obtained only when 4 equivalents (2 mols) of sulfuric acid are used. In this manner the 2 equivalents of ammonia formed in the reaction and also the resulting diamine are converted into their corresponding sulfates according to the equation:

$$2C_6H_4(NH_2)_2.H_2SO_4 + CO(NH_2)_2 \rightarrow$$
$$CO(NHC_6H_4NH_2)_2.H_2SO_4 + (NH_4)_2SO_4$$

The use of hydrochloric acid instead of sulfuric acid leads in this case to substantially less favorable results, but the cause of this phenomenon is not known with certainty. A decided excess of sulfuric acid, that is to say, the use of substantially more than 4 equivalents, and also the use of substantially less than 4 equivalents, lead to poorer yields.

In the condensation of urea with meta-phenylene diamine the use of a fairly concentrated solution or suspension of the starting materials is of advantage, and, with respect to the quantity of sulfuric acid used, this entails a rather concentrated sulfuric acid solution, which may contain, for example, 5 parts by weight of $H_2SO_4$ in 14 parts by weight of the solution.

Generally speaking the reaction will be complete after a period of condensation of 48 hours when a temperature of about 103° C. is used. In many cases, however, a shorter period of reaction suffices, for example, 24 to 32 hours, especially if it is not desired to obtain a maximum yield. The reaction components are advantageously used in the stoichiometric proportions of 1 mol of urea to 2 mols of the diamine. When it is desired to utilize as much as possible of the diamine component, it is permissible in some cases, especially in the reaction of urea with meta-phenylene diamine, to use a certain excess (up to about 30 per cent) of urea without leading to the formation of larger quantities of the monosubstituted urea.

The following examples illustrate the invention, the parts being by weight unless otherwise stated, and the relationship of parts by weight to parts by volume being the same as that of the kilogram to the litre:

Example 1

60 parts of para-phenylene diamine and 15 parts of urea are boiled in 500 parts of water in a reflux apparatus, while stirring. When boiling commences the evolution of ammonia begins. In the course of boiling for 24 hours the initially clear solution is converted into a thick magma. The latter is filtered, and the filter residue is dissolved in dilute hydrochloric acid. After filtering the solution, the 4:4'-diamino-diphenyl-urea may be precipitated from the filtrate in the usual manner by admixture with an alkali or ammonia.

A dichlorinated 4:4'-diamino-diphenyl-urea can be obtained in an analogous manner from 1:4-diamino-2-chlorobenzene and urea. The position of the chlorine atoms has not yet been determined.

*Example 2*

54 parts of meta-phenylene diamine are introduced into 110 parts by volume of sulfuric acid of 38.5 per cent. strength by weight, and the whole is stirred until dissolution is complete, during which the temperature rises to about 65–70° C. 19 parts of urea are then added, and the whole is heated to boiling. Boiling is continued, while continuously stirring, for 32 hours under reflux, the temperature being about 103–104° C., and then about 120 parts of water are added. The whole is filtered at about 80° C. and the separated sulfate of 3:3'-diamino-diphenyl-urea is washed with about 200 parts of cold water.

The sulfate so obtained can be converted into the free base in the usual manner. It is of advantage first to convert the sulfate into the chloride by reaction with barium chloride, and to liberate the free base from the latter.

What I claim is:

1. A process for the manufacture of 4:4'-diamino-diphenyl-urea which comprises condensing 2 molecular proportions of 1:4-diaminobenzene with about one molecular proportion of urea in an aqueous medium at about 100° C.

2. A process for the manufacture of 3:3'-diamino-diphenyl-urea which comprises condensing 2 molecular proportions of 1:3-diaminobenzene with about one molecular proportion of urea in an aqueous medium at about 100° C.

3. A process for the manufacture of 3:3'-diamino-diphenyl-urea which comprises condensing 2 molecular proportions of 1:3-diaminobenzene with about one molecular proportion of urea in an aqueous medium containing about two molecular proportions of sulfuric acid for each molecular proportion of 1:3-diamino-benzene.

4. A process for the manufacture of a diamino-diphenyl-urea which comprises condensing two molecular proportions of a diaminobenzene selected from the group consisting of 1:3 and 1:4-diaminobenzenes, with about one molecular proportion of urea in an aqueous medium at about 100° C.

ALBERT BRUNNER.

REFERENCES CITED

The following references are of record in the file of this patent:

UNITED STATES PATENTS

| Number | Name | Date |
|---|---|---|
| 1,617,847 | Heinze | Feb. 15, 1927 |

FOREIGN PATENTS

| Number | Country | Date |
|---|---|---|
| 367,611 | Germany | Jan. 24, 1923 |